(12) United States Patent
Lee et al.

(10) Patent No.: US 11,365,153 B2
(45) Date of Patent: Jun. 21, 2022

(54) METHOD FOR PREPARING POROUS TITANIA THIN FILM BY USING CELLULOSE NANOCRYSTAL

(71) Applicant: National Institute Of Forest Science, Seoul (KR)

(72) Inventors: Sun Young Lee, Seoul (KR); Won Hee Lee, Yongin-Si (KR); Yong Hee Yoon, Seoul (KR); Sang Jin Chun, Namyangju-Si (KR); Sang Bum Park, Seoul (KR); Don Ha Choi, Seoul (KR)

(73) Assignee: National Institute Of Forest Science, Seoul (KR)

( * ) Notice: Subject to any disclaimer, the term of this patent is extended or adjusted under 35 U.S.C. 154(b) by 112 days.

(21) Appl. No.: 16/468,604

(22) PCT Filed: Dec. 13, 2016

(86) PCT No.: PCT/KR2016/014562
§ 371 (c)(1),
(2) Date: Jun. 11, 2019

(87) PCT Pub. No.: WO2018/110720
PCT Pub. Date: Jun. 21, 2018

(65) Prior Publication Data
US 2019/0284097 A1    Sep. 19, 2019

(30) Foreign Application Priority Data

Dec. 12, 2016  (KR) .................... 10-2016-0168607

(51) Int. Cl.
*C04B 35/46* (2006.01)
*C04B 35/622* (2006.01)
(Continued)

(52) U.S. Cl.
CPC .............. *C04B 35/46* (2013.01); *B01J 21/06* (2013.01); *B01J 35/00* (2013.01); *B01J 37/00* (2013.01);
(Continued)

(58) Field of Classification Search
None
See application file for complete search history.

(56) References Cited

U.S. PATENT DOCUMENTS 10,069,127 B2 * 9/2018 Lee ................... H01M 50/431

OTHER PUBLICATIONS

Henry et al., (Conversion of Nanocellulose Aerogel into TiO2 and TiO2@C Nanothorns by Direct Anhydrous Mineralization with TiCl4. Evaluation of Electrochemical Properites in Li Batteries, Applied Materials and Interfaces, vol. 7, p. 14584-14592, Apr. 16, 2015).*

(Continued)

*Primary Examiner* — Jun Li
(74) *Attorney, Agent, or Firm* — Osha Bergman Watanabe & Burton LLP

(57) ABSTRACT

The present invention relates to a composite material including a porous titania thin film and a preparation method therefor. A composite material according to the present invention allows for a simple thin film formation process because of the use of cellulose crystals, makes it easy to control the structure of the titanium dioxide thin film provided therefor, has a large specific area, and is superior in terms of scratch resistance and photoactivity, thus finding useful applications in the various fields utilizing titanium dioxide as a photocatalyst.

7 Claims, 6 Drawing Sheets

(51) Int. Cl.
   *C04B 35/636* (2006.01)
   *C04B 38/00* (2006.01)
   *B01J 21/06* (2006.01)
   *B01J 37/08* (2006.01)
   *B01J 35/00* (2006.01)
   *B01J 37/00* (2006.01)
   *C04B 35/63* (2006.01)
   *B01J 37/02* (2006.01)
   *C23C 22/80* (2006.01)
   *C04B 38/06* (2006.01)
   *C04B 35/638* (2006.01)

(52) U.S. Cl.
   CPC ............ *B01J 37/08* (2013.01); *C04B 35/622* (2013.01); *C04B 35/62218* (2013.01); *C04B 35/63* (2013.01); *C04B 35/636* (2013.01); *C04B 35/6365* (2013.01); *C04B 38/00* (2013.01); *B01J 21/063* (2013.01); *B01J 35/004* (2013.01); *B01J 37/02* (2013.01); *B01J 37/082* (2013.01); *C04B 35/638* (2013.01); *C04B 38/0022* (2013.01); *C04B 38/06* (2013.01); *C04B 2235/3232* (2013.01); *C04B 2235/549* (2013.01); *C04B 2235/963* (2013.01); *C23C 22/80* (2013.01)

(56) References Cited

OTHER PUBLICATIONS (Tailoring the Morphology of Mesoporous Titania Thin Films through Biotemplating with Nanocrystalline Celloluse, Journal of The American Chemical Society, Feb. 17, 2014, vol. 136, p. 5930-5937).*

Kelyp (Sol-Gel Synthesis and Characterization of mesoporous TiO2 Modified with Transition metal ions (Cu, Ni, Mn, Cu) Himia, Fizika ta Tehnologia Poverhni, NOv. 30, 2015, vol. 4 (1), p. 105-112).*

Synder et al. (Reusable photocatalytic titanium dioxide-cellulose nanofiber films, Journal of Colloid and Interface Science 399 (2013) 92-98), publication date Mar. 6, 2013.*

* cited by examiner

[FIG. 1]
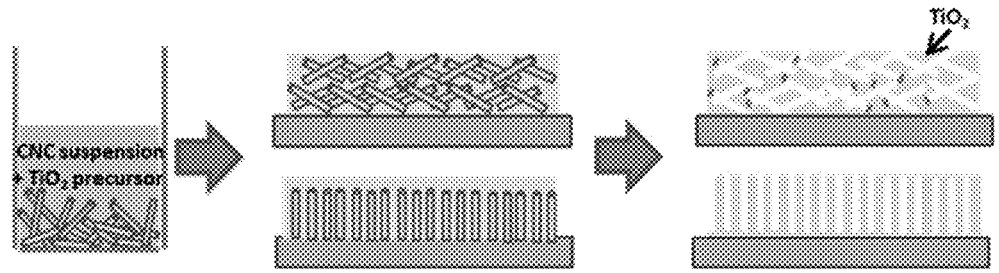
[FIG. 2A] 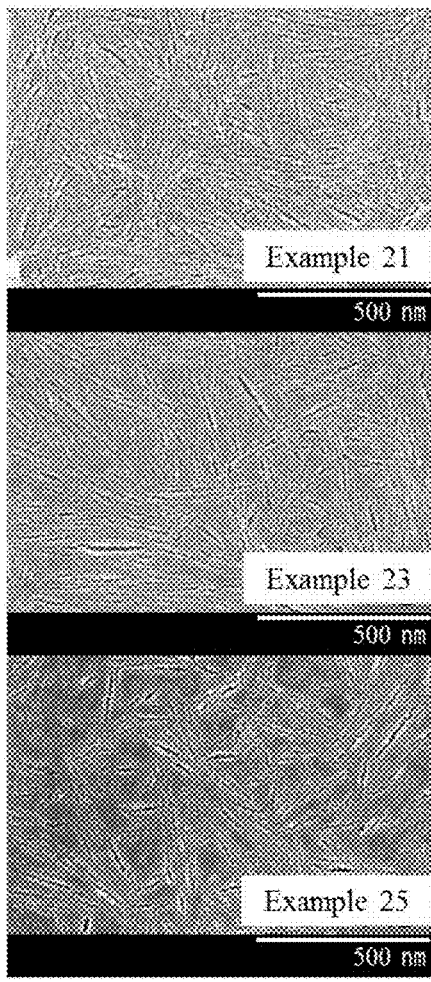 [FIG. 2B] 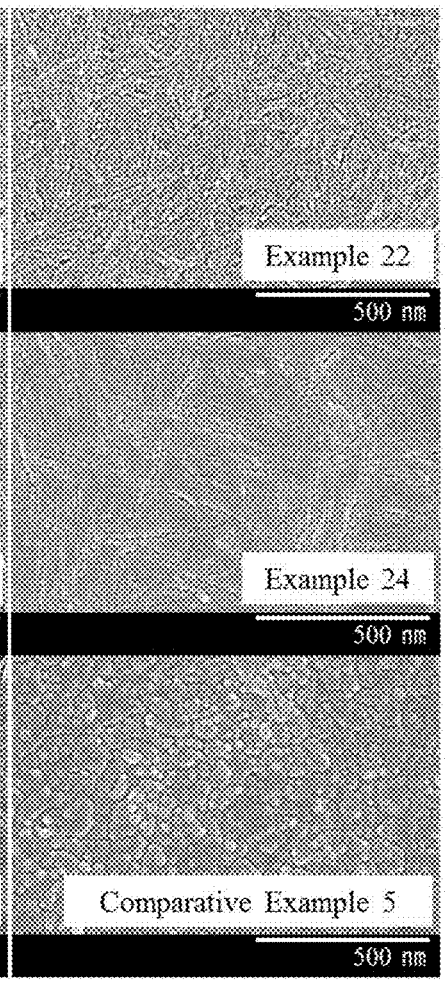
[FIG. 2C] [FIG. 2D]
[FIG. 2E] [FIG. 2F]

[FIG. 3A] 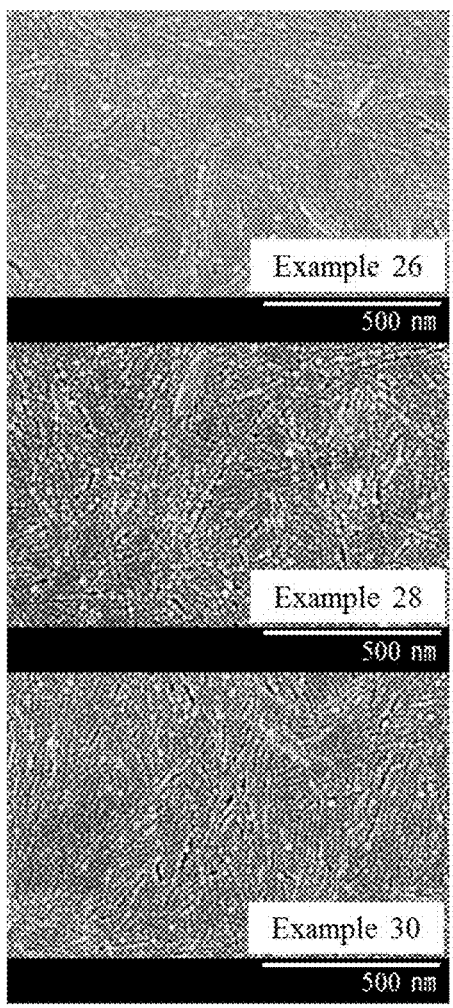
[FIG. 3B] 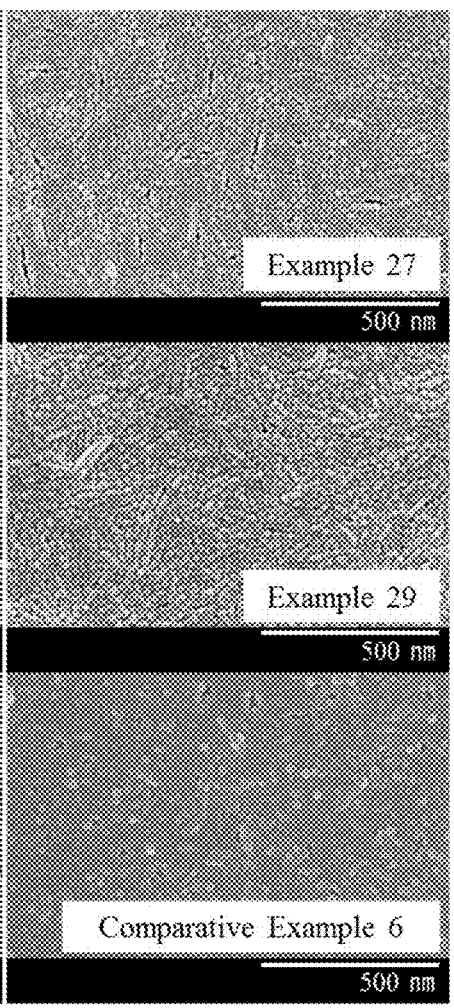
[FIG. 3C]
[FIG. 3D]
[FIG. 3E] 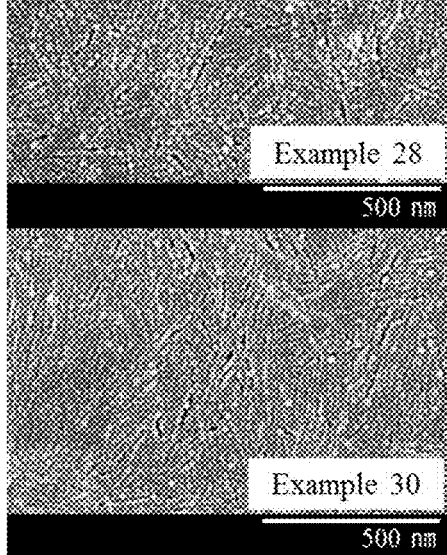 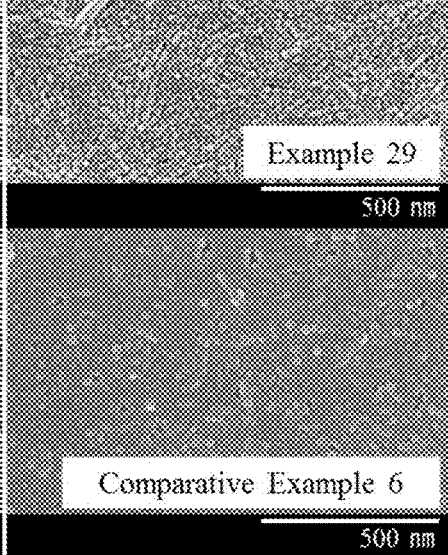 [FIG. 3F]
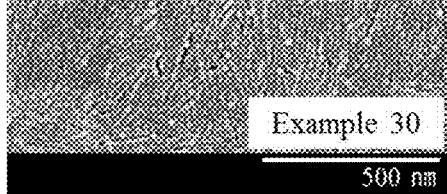 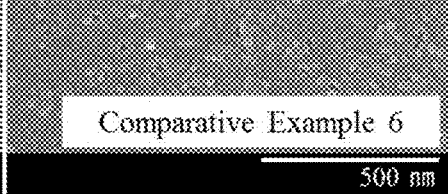

[FIG. 4]
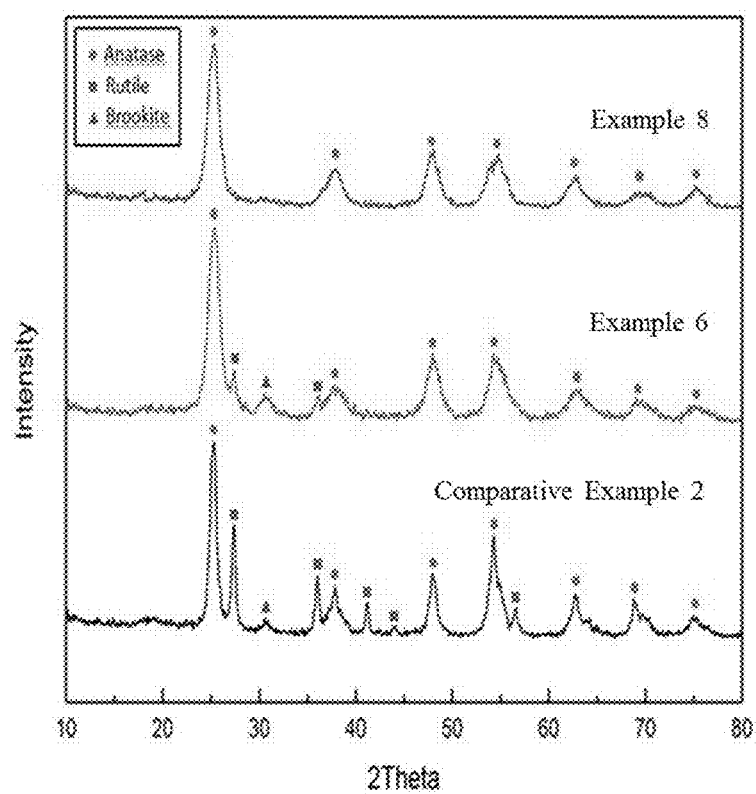

[FIG. 5]
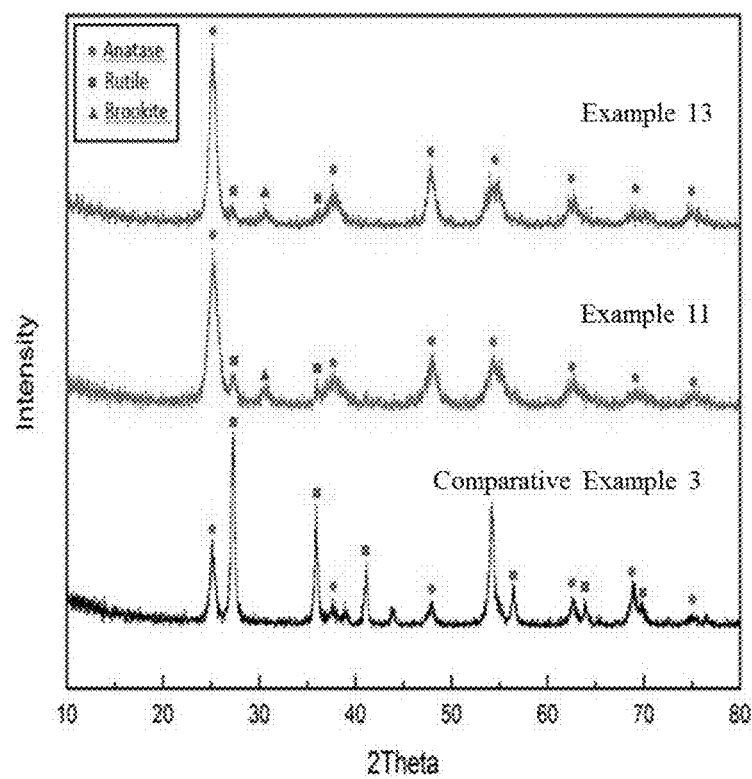

[FIG. 6A]
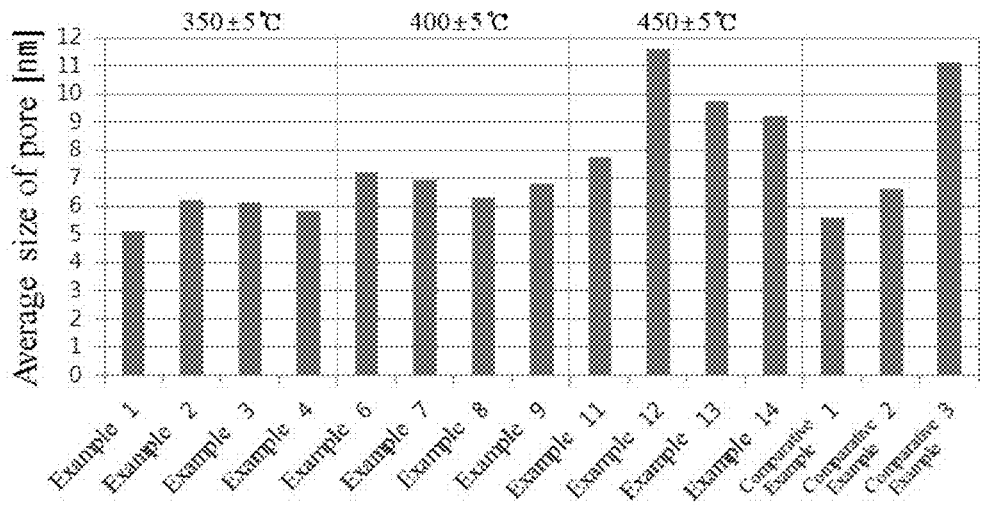
[FIG. 6B]
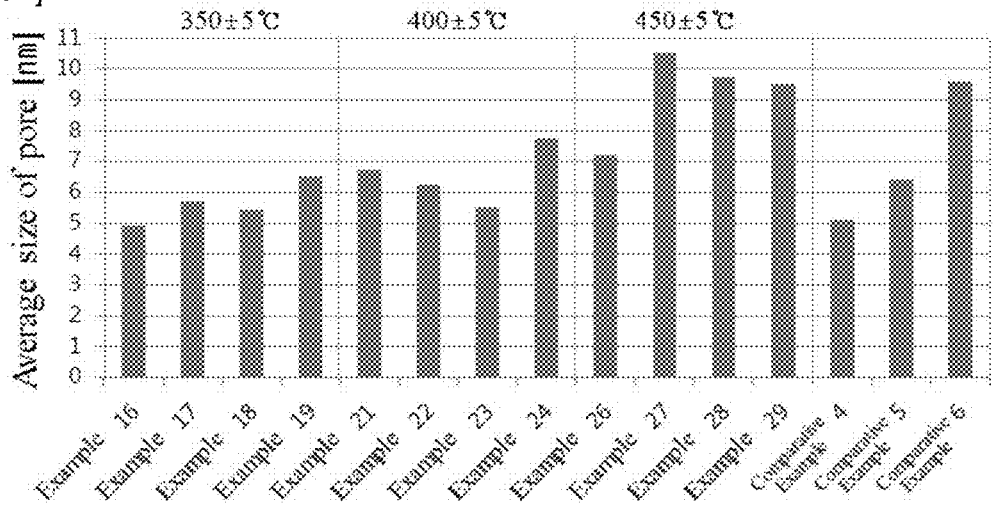

[FIG. 7A]
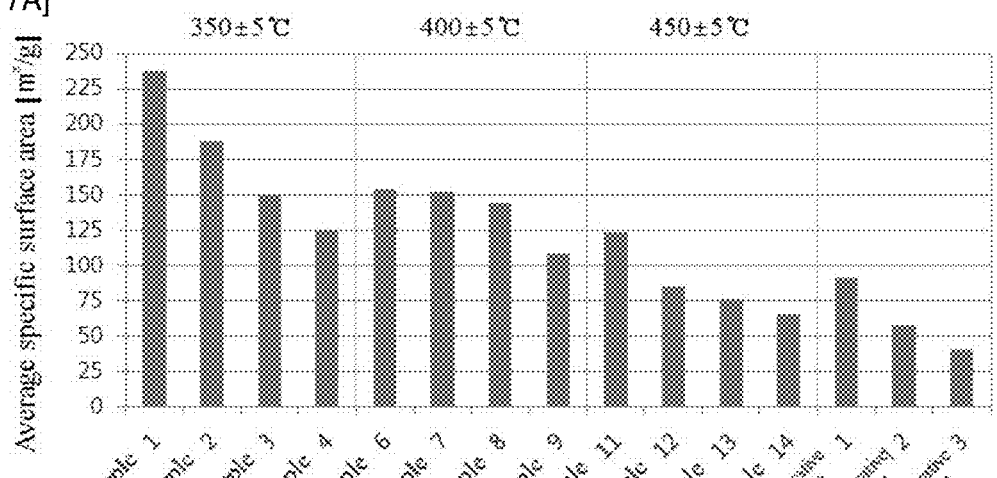
[FIG. 7B]
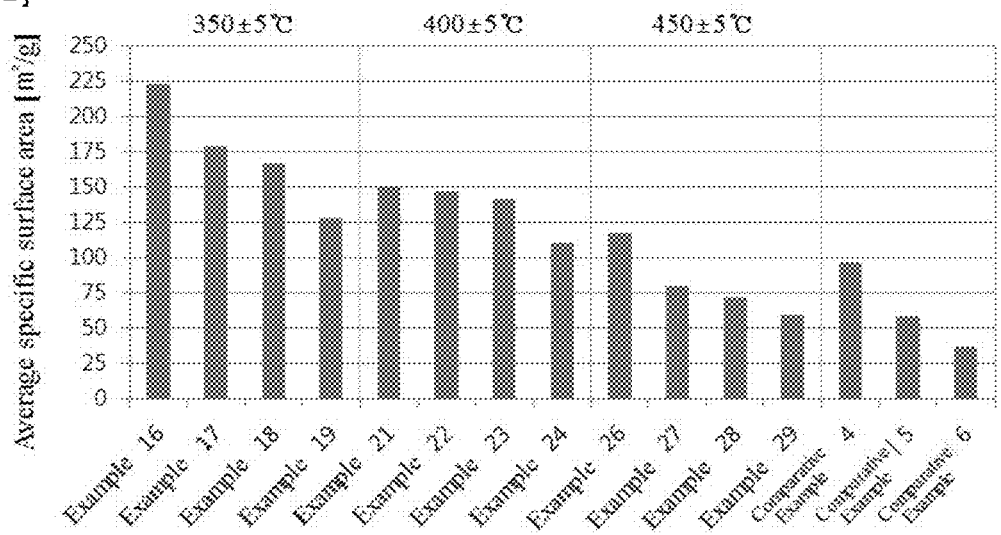

METHOD FOR PREPARING POROUS TITANIA THIN FILM BY USING CELLULOSE NANOCRYSTAL

TECHNICAL FIELD

The present invention relates to a composite material including a porous titania thin film and a method of preparing the same.

BACKGROUND ART

Photocatalysts are materials having a strong capacity for oxidation and reduction by means of ultraviolet light contained in sunlight or fluorescent lamps. Among them, titanium dioxide ($TiO_2$) having advantages of excellent photoactivity, chemical and biological stability, durability, economic feasibility, and the like has been the most widely used.

In the case of titanium dioxide ($TiO_2$), electron-hole pairs are generated inside thereof by means of the light having a wavelength with energy equal to or greater than the N-type semiconductor bandgap, and when the electrons thus generated flow to the external circuit, electron-hole pairs flowing to the external circuit react with an adsorbate at the surface of titanium dioxide ($TiO_2$), whereby an oxidation and reduction reaction occurs. That is, the reduction reaction proceeds by electrons, and the oxidation reaction proceeds by holes.

Recently, there has been an increasing tendency to utilize these characteristics of titanium dioxide ($TiO_2$). For this reason, research is being actively conducted on increasing the specific surface area or photoactivity of titanium dioxide ($TiO_2$). As an example, Korean Unexamined Patent Publication No. 2004-0005412 discloses a technique for preparing porous titania ($TiO_2$) through an aerosol process.

However, techniques that have been developed so far have a limitation in immobilizing the prepared titania ($TiO_2$). A technique in which thin-film-type titania ($TiO_2$) is prepared and then immobilized also has problems of a low coating speed, a need for expensive equipment, and low photoactivity caused by a significant decrease in specific surface area of titania ($TiO_2$).

Therefore, there is an urgent need to develop a titanium dioxide thin film which can be prepared quickly through a simple and economical process and has excellent photoactivity as well as a large specific surface area.

DISCLOSURE

Technical Problem

The present invention is directed to providing a composite material including a porous titanium dioxide thin film that is not only prepared through a simple and economical process but also has a large specific surface area and excellent photoactivity.

Technical Solution

One aspect of the present invention provides a composite material that includes: a substrate; and a titanium dioxide thin film formed on the substrate, wherein the thin film includes a pore satisfying conditions of Expressions 1 and 2 below:

$$10 \leq L \leq 300 \quad \text{[Expression 1]}$$

$$1 \leq L/D \leq 100 \quad \text{[Expression 2]}$$

In Expressions 1 and 2,

L represents an average size in a longitudinal direction of a pore,

D represents an average size in a thickness direction of a pore, and

L and D are indicated in units of nm.

Another aspect of the present invention provides a method of preparing the above-described composite material and a photocatalyst including the composite material.

Advantageous Effects

A composite material according to the present invention can be beneficially used in various fields utilizing titanium dioxide as a photocatalyst because a titanium dioxide thin film included in the composite material is formed through a simple process by using cellulose nanocrystals, the structure of the thin film is easily controlled, and the thin film also has a large specific surface area, excellent scratch resistance, and excellent photoactivity.

DESCRIPTION OF DRAWINGS

FIG. 1 is a conceptual diagram illustrating a process of forming a titanium dioxide thin film.

FIGS. 2A-2F show scanning electron microscope (SEM) images of the surface of a composite material calcined at 400±5° C.

FIGS. 3A-3F show SEM images of the surface of a composite material calcined at 450±5° C.

FIG. 4 shows an X-ray diffraction (XRD) spectrum of a composite material calcined at 400±5° C.

FIG. 5 shows an XRD spectrum of a composite material calcined at 450±5° C.

FIGS. 6A-6B show graphs illustrating an average size of pores formed in a titanium dioxide thin film according to a titanium dioxide precursor and a calcination temperature: (FIG. 6A) TTIP; and (FIG. 4B) TEOT.

FIGS. 7A-7B show graphs illustrating an average specific surface area of pores formed in a titanium dioxide thin film according to a titanium dioxide precursor and a calcination temperature: (FIG. 7A) TTIP; and (FIG. 7B) TEOT.

BEST MODE

As the present invention allows for various changes and a variety of embodiments, particular embodiments will be illustrated in the drawings and described in detail in the detailed description.

However, this is not intended to limit the present invention to specific embodiments, and it should be understood that all changes, equivalents, or substitutes within the spirit and technical scope of the present invention are included in the present invention.

In the present invention, it should be understood that the term "include" or "have" is merely intended to indicate that features, numbers, steps, operations, components, parts, or combinations thereof are present, and not intended to exclude the possibility that one or more other features, numbers, steps, operations, components, parts, or combinations thereof will be present or added.

Also, drawings attached to the present specification should be understood as being enlarged or reduced for the sake of convenience of the description.

The present invention relates to a composite material including a porous titania thin film and a method of preparing the same.

Photocatalysts are materials having a strong capacity for oxidation and reduction by means of ultraviolet light contained in sunlight or fluorescent lamps. Among them, titanium dioxide ($TiO_2$) having advantages of excellent photoactivity, chemical and biological stability, durability, economic feasibility, and the like has been the most widely used. However, $TiO_2$-related techniques that have been developed so far have a limitation in immobilizing the prepared titania ($TiO_2$). A technique in which thin-film-type titania ($TiO_2$) is prepared and then immobilized also has problems of a low coating speed, a need for expensive equipment, and low photoactivity caused by a significant decrease in specific surface area of titania ($TiO_2$).

Accordingly, the present invention provides a composite material including a porous titanium dioxide thin film and a method of preparing the same.

A composite material according to the present invention can be beneficially used in various fields utilizing titanium dioxide as a photocatalyst because a titanium dioxide thin film included in the composite material is formed through a simple process by using cellulose nanocrystals, the structure of the thin film is easily controlled, and the thin film also has a large specific surface area, excellent scratch resistance, and excellent photoactivity.

Hereinafter, the present invention will be described in detail.

Composite Material

According to an embodiment of the present invention, there is provided a composite material that includes: a substrate; and a titanium dioxide ($TiO_2$) thin film formed on the substrate, wherein the thin film includes a pore satisfying conditions of Expressions 1 and 2 below:

$$10 \leq L \leq 300 \quad \text{[Expression 1]}$$

$$1 \leq L/D \leq 100 \quad \text{[Expression 2]}$$

Expressions 1 and 2,

L represents an average size in a longitudinal direction of a pore,

D represents an average size in a thickness direction of a pore, and

L and D are indicated in units of nm.

The composite material according to the present invention has a structure in which a titanium dioxide thin film exhibiting photoactivity is formed on a substrate, and the titanium dioxide thin film has a porous structure. In this case, pores formed in the titanium dioxide thin film have a rod shape and/or a fiber shape, and may have an average size in a longitudinal direction (L) of 10 nm to 300 nm and a ratio (L/D) of an average size in a longitudinal direction (L) to an average size in a thickness direction (D) of 1 to 250. Specifically, the pores may have an average size in a longitudinal direction (L) of 20 nm to 300 nm, 100 nm to 300 nm, 150 nm to 300 nm 50 nm to 250 nm, 100 nm to 250 nm, 150 nm to 250 nm, or 180 nm to 230 nm and a ratio (L/D) of an average size in a longitudinal direction (L) to an average size in a thickness direction (D) of 2 to 80, 5 to 70, 10 to 75, 15 to 70, 20 to 60, or 22 to 58.

As an example, the pores formed in the titanium dioxide thin film may have an average size in a longitudinal direction (L) of 190 to 210 nm and a ratio (L/D) of an average size in a longitudinal direction (L) to an average size in a thickness direction (D) of 22 to 58.

In the present invention, the morphology of the pore formed in the titanium dioxide thin film is controlled to adjust an average size in a longitudinal direction (L) of the pore and a ratio (L/D) of an average size in a longitudinal direction (L) and an average size in a thickness direction (D) within the above-described ranges, so that an average specific surface area of the titanium dioxide thin film exhibiting photoactivity may be maximized.

For example, the titanium dioxide thin film included in the composite material according to the present invention may have an average specific surface area of 10 $m^2/g$ to 500 $m^2/g$, more specifically, 50 $m^2/g$ to 400 $m^2/g$, 50 $m^2/g$ to 350 $m^2/g$, 100 $m^2/g$ to 300 $m^2/g$, 100 $m^2/g$ to 250 $m^2/g$, or 115 $m^2/g$ to 230 $m^2/g$.

In this case, the titanium dioxide thin film may have an average thickness of 10 nm to 500 nm, more specifically, 50 nm to 500 nm, 100 nm to 500 nm, 150 nm to 500 nm, 200 nm to 500 nm, 250 nm to 500 nm, 300 nm to 500 nm, 350 nm to 500 nm, 400 nm to 500 nm, 50 nm to 200 nm, 100 nm to 300 nm, 200 nm to 400 nm, 150 nm to 350 nm, 100 nm to 250 nm, or 150 nm to 250 nm.

In addition, since the titanium dioxide thin film includes titanium dioxide ($TiO_2$) with an anatase crystalline phase, it may exhibit high photoactivity. Titanium dioxide ($TiO_2$) may have anatase, rutile, and brookite crystalline phases, and, among them, an anatase crystalline phase is known to have the highest photoactivity. The composite material according to the present invention may contain an anatase crystalline phase exhibiting high photoactivity at about 70% by weight or more, specifically, 80% by weight or more, 85% by weight or more, 90% by weight or more, 95% by weight or more, 80 to 100% by weight, 85 to 100% by weight, 90 to 100% by weight, 95 to 100% by weight, 98 to 100% by weight, 80 to 99.9% by weight, 85 to 99.9% by weight, 90 to 99.9% by weight, 95 to 99.9% by weight, or 98 to 99.9% by weight with respect to the entire titanium dioxide ($TiO_2$) crystals included in the titanium dioxide thin film.

As an example, since the titanium dioxide thin film of the composite material according to the present invention contains an anatase crystalline phase at 98 to 100% by weight, in XRD analysis of the titanium dioxide thin film, the composite material exhibits the diffraction peaks of an anatase crystalline phase of titanium dioxide, specifically, a peak at 2θ=25.3±0.5° corresponding to the [1,0,1] plane, a peak at 2θ=37.8±0.5° corresponding to the [0,0,4] plane, a peak at 2θ=48.1±0.5° corresponding to the [2,0,0] plane, a peak at 2θ=53.9±0.5° corresponding to the [1,0,5] plane, a peak at 2θ=55.1±0.5° corresponding to the [2,1,1] plane, a peak at 2θ=62.7±0.5° corresponding to the [2,0,4] plane, a peak at 2θ=68.8±0.5° corresponding to the [1,1,6] plane, a peak at 2θ=70.3±0.5° corresponding to the [2,2,0] plane, and a peak at 2θ=75.1±0.5° corresponding to the [2,1,5] plane which have an intensity of 10 a.u. or more based on the strongest peak (100 a.u.). In addition, the composite material does not exhibit the peaks of a rutile crystalline phase of titanium dioxide, that is, a peak at 2θ=27.5±0.5° corresponding to the [1,1,0] plane and a peak at 2θ=36.1±0.5° corresponding to the [1,0,1] plane; and the peak of a brookite crystalline phase of titanium dioxide, that is, a peak at 2θ=30.8±0.5° corresponding to the [1,2,1] plane.

Furthermore, the titanium dioxide thin film may include titanium dioxide doped with one or more transition metals selected from the group consisting of molybdenum (Mo), niobium (Nb), tungsten (W), iron (Fe), cobalt (Co), silver (Ag), and nickel (Ni) to increase photoactivity. Although titanium dioxide with an anatase crystalline phase exhibits high photoactivity, its activity is exhibited only when light having a wavelength of 385 nm or more, that is, light within the ultraviolet ray region having an energy of 3.2 eV or more, is irradiated, and therefore it is difficult to practically use the titanium dioxide. However, when titanium dioxide is doped with a transition metal, the bandgap energy of titanium dioxide is lowered, and thus photoactivity may be exhibited by means of light within the visible light region having a lower energy. In this case, the transition metal with which titanium dioxide is doped may be included at 0.01 to 10 parts by weight, specifically, 0.01 to 5 parts by weight, 0.01 to 2 parts by weight, 0.01 to 1 part by weight, or 0.02 to 0.08 part by weight with respect to 100 parts by weight of the entire titanium dioxide. For example, the composite material according to the present invention may include a thin film formed of titanium dioxide with an anatase crystalline phase, which is doped with molybdenum (Mo), niobium (Nb), or tungsten (W) at 0.04 to 0.06 part by weight with respect to 100 parts by weight of the entire titanium dioxide.

In addition, the titanium dioxide thin film has enhanced scratch resistance. Therefore, upon measurement of the scratch hardness of the titanium dioxide thin film, the titanium dioxide thin film may exhibit an average scratch hardness of 10 N to 50 N. Specifically, the titanium dioxide thin film is indented while applying a load of 1 to 200 N using a 30 nm steel ball provided in a Rockwell hardness measuring instrument, and a load applied when a scratch occurs on the surface of the thin film is referred to as scratch hardness. The titanium dioxide thin film may have an average scratch hardness of 10 N to 50 N, 10 N to 40 N, 10 N to 35 N, 15 N to 35 N, 20 N to 35 N, 20 N to 40 N, 10 N to 20 N, 15 N to 25 N, 18 N to 22 N, 20 N to 25 N, 25 N to 30 N, 30 N to 35 N, 22 N to 28 N, 27 N to 33 N, 10 N to 15 N, or 11 N to 15 N.

Meanwhile, the titanium dioxide thin film may include pores which are arranged in one direction, that is, the pores are highly oriented in one direction. Specifically, the titanium dioxide thin film includes rod- and/or fiber-shaped pores, and the pores may have one specific directionality in their arrangement, wherein the pores accounting for about 80% or more of the entire pores are aligned in such a way that the deviation between the average angle of directionality and the alignment angle of individual pores based on the average angle is within 10°. In the present invention, the arrangement of pores formed in the titanium dioxide thin film is controlled as described above, so that when the composite material is used in photoelectric devices such as dye-sensitized cells and the like, the amount and duration of a dye to be supported can be reduced, and when used in purification devices configured to purify water or air, purified water or air can be discharged in a desired direction, and thus no additional device or energy for recovery of the purified object is required, thereby an economical effect can be achieved.

Method of Preparing Composite Material

According to another embodiment of the present invention, there is provided a method of preparing a composite material that includes: applying a mixture including a titanium dioxide precursor and cellulose crystals onto a substrate; and thermally treating the applied mixture to form a titanium dioxide thin film, wherein the thin film includes a pore satisfying conditions of Expressions 1 and 2 below:

$$10 \leq L \leq 300 \quad \text{[Expression 1]}$$

$$1 \leq L/D \leq 100 \quad \text{[Expression 2]}$$

In Expressions 1 and 2,

L represents an average size in a longitudinal direction of a pore,

D represents an average size in a thickness direction of a pore, and

L and D are indicated in units of nm.

The method of preparing a composite material according to the present invention may induce the formation of titanium dioxide with a large average specific surface area and an anatase crystalline phase at a low temperature by using a mixture including cellulose crystals along with a titanium dioxide precursor in the formation of a titanium dioxide thin film.

In this case, the titanium dioxide precursor is not particularly limited as long as it contains a tetravalent titanium ion ($Ti^{4+}$). For example, the titanium dioxide precursor may be one or more selected from the group consisting of titanium tetraisopropoxide (TTIP), titanium ethoxide (TEOT), titanium butoxide, and titanium tetrachloride, and specifically, may be TTIP or TEOT.

In addition, the titanium dioxide precursor may be included in the mixture in such a way that a weight ratio ($Ti^{4+}$/CNC) of the tetravalent titanium ion ($Ti^{4+}$) included in the titanium dioxide precursor to the cellulose nanocrystal (CNC) is 0.1 to 10. Specifically, the titanium dioxide precursor may be included in the mixture in such a way that a weight ratio ($Ti^{4+}$/CNC) of the tetravalent titanium ion ($Ti^{4+}$) included in the titanium dioxide precursor to the cellulose nanocrystal (CNC) is 0.1 to 5, 0.1 to 3, 0.5 to 10, 0.5 to 5, 0.5 to 3, 1 to 10, 1 to 5, 1 to 3, 2 to 5, 3 to 5, 4 to 6, 5 to 10, 2 to 8, 0.5 to 2, 0.5 to 1.5, 1 to 2, 1 to 1.5, 1 to 2.5, 1.5 to 2.5, 2 to 2.5, 0.5 to 0.25, or 0.4 to 0.26. In the present invention, the content of the titanium dioxide precursor included in the mixture is adjusted in such a way that a weight ratio ($Ti^{4+}$/CNC) of the tetravalent titanium ion ($Ti^{4+}$) included in the titanium dioxide precursor and the cellulose nanocrystal (CNC) is within the above-described range, so that the porosity of the titanium dioxide thin film may be appropriately adjusted to enhance an average specific surface area of the titanium dioxide thin film.

In addition, the cellulose crystals may have a rod shape and/or a fiber shape, and may be cellulose nanocrystals having an average size on the order of nanometers. As an example, the cellulose crystals may have an average length of 1 nm to 500 nm and an average diameter of 0.1 nm to 10 nm. Specifically, the cellulose crystals may have an average length of 10 nm to 500 nm, 100 nm to 500 nm, 150 nm to 500 nm, 200 nm to 500 nm, 250 nm to 500 nm, 300 nm to 500 nm, 350 nm to 500 nm, 400 nm to 500 nm, 50 nm to 200 nm, 100 nm to 300 nm, 200 nm to 400 nm, 150 nm to 350 nm, 80 nm to 200 nm, 120 nm to 250 nm, 100 nm to 250 nm, or 150 nm to 250 nm. Also, the cellulose crystals may have an average diameter of 1 nm to 5 nm, 5 nm to 10 nm, 5 nm to 7 nm, 3 nm to 5 nm, 7 nm to 9 nm, 2 nm to 9 nm, or 4 nm to 8 nm.

The cellulose crystals included in the mixture applied onto the substrate are carbonized when the mixture is thermally treated, that is, when the composite material is calcined. In this process, the cellulose crystals may serve to induce the formation of a pore in the titanium dioxide thin film and titanium dioxide to have an anatase crystalline phase at a low temperature. Therefore, in the present invention, it is possible to easily control the structure of a pore formed in the titanium dioxide thin film prepared by using rod- and/or fiber-shaped cellulose crystals whose average length and average diameter satisfy the above-described ranges, and maximize an average specific surface area of the thin film.

Furthermore, the mixture may further include an inorganic acid, specifically, hydrochloric acid, in addition to the titanium dioxide precursor and the cellulose crystals. The hydrochloric acid included in the mixture may serve as a catalyst that enhances the solubility of the titanium dioxide precursor such as TTIP and the like.

In this case, the hydrochloric acid may be used in the form of an aqueous solution in which 35±3 wt % hydrochloric acid is dissolved in water, and the hydrochloric acid aqueous solution may be included at 50 to 90 parts by weight with respect to 100 parts by weight of the titanium dioxide precursor. As an example, the hydrochloric acid may be included at 50 to 80 parts by weight, 50 to 75 parts by weight, 60 to 80 parts by weight, 60 to 75 parts by weight, 65 to 75 parts by weight, 70 to 73 parts by weight, 50 to 60 parts by weight, 50 to 55 parts by weight, 55 to 60 parts by weight, or 56 to 58 parts by weight with respect to 100 parts by weight of the titanium dioxide precursor. As an example, when used in the form of a 37±0.5 wt % aqueous solution, the hydrochloric acid may be included at 57.3±0.2 parts by weight with respect to 100 parts by weight of the titanium dioxide precursor.

Meanwhile, in the present invention, the thermal treatment of the mixture may reduce the titanium dioxide precursor included in the mixture to titanium dioxide and carbonize cellulose crystals to induce a porous structure.

In this case, a temperature of the thermal treatment is not particularly limited as long as the thermal treatment is carried out at a higher temperature than a temperature at which cellulose crystals are pyrolyzed. Specifically, a temperature of the thermal treatment may be 300° C. at which cellulose crystals are pyrolyzed or more, more specifically, 300° C. to 600° C., 300° C. to 500° C., 300° C. to 400° C., 350° C. to 500° C., 350° C. to 450° C., 340° C. to 460° C., 380° C. to 420° C., 390° C. to 410° C., or 340° C. to 410° C. In the present invention, a temperature of the thermal treatment of the mixture is controlled within the above-described range, so that agglomeration of reduced titanium dioxide particles may be suppressed, and thus a decrease in specific surface area of the titanium dioxide thin film, which is caused by a high temperature, may be prevented.

In addition, the thermal treatment may be carried out for 10 to 100 minutes, specifically, 30 to 90 minutes or 50 to 70 minutes.

Photocatalyst

According to still another embodiment of the present invention, there is provided a photocatalyst including the composite material according to the present invention.

Since the photocatalyst according to the present invention includes the composite material with high photoactivity as described above, it is excellent in not only photoactivity, specifically, excellent photoactivity with respect to ultraviolet (UV) rays and visible light but also properties such as scratch resistance and the like. Therefore, the photocatalyst can be widely used in a variety of fields such as architectural fields related to interior and exterior materials having an effect of decomposing harmful substances, energy fields where photoelectric devices are used, environmental fields related to air or water purification, and the like.

Modes of the Invention

Hereinafter, the present invention will be described in more detail according to examples and experimental examples.

However, it should be understood that the following examples and experimental examples proposed herein are given for the purpose of illustration only and are not intended to limit the scope of the present invention.

Preparation Example 1

Preparation of Cellulose Nanocrystals (CNCs)

Cellulose powder (average particle diameter: 300±50 μm, 10 g) and 64 vol % sulfuric acid ($H_2SO_4$, 175 ml) were fed into a 1 L beaker, the beaker was put into a 3 L beaker, and distilled water was injected into the 3 L beaker to set a heating atmosphere in boiling water. Afterward, the 3 L beaker was placed on a hot plate, reactants were vigorously stirred at 45° C. for 45 minutes, then a reaction product was transferred to a 5 L beaker, and distilled water was fully injected to lower acidity. Afterward, cellulose nanocrystals were completely sunk in the reaction product, and a supernatant was removed. This decanting process was repeated 6 times to neutralize acidity (□ pH 7.0), and centrifugation was carried out at 10,000 rpm for 10 minutes to remove a residual distilled water layer, thereby preparing a cellulose nanocrysta (CNC)

Examples 1 to 15

Preparation of Composite Material

Titanium tetraisopropoxide (TTIP) was prepared as a titanium dioxide ($TiO_2$) precursor, and the CNC dispersion solution prepared in Preparation Example 1 was diluted to a concentration of 8.7 wt %. Afterward, TTIP (1.334 g, 4.695 mmol) and a 37±0.5 wt % hydrochloric acid solution (0.765 g, 9.23 mmol) were mixed for 10 minutes to induce a sol-gel reaction, and cellulose crystals were then added in such a way that a weight ratio ($Ti^{4+}$/CNC) of a tetravalent titanium ion ($Ti^{4+}$) present in the sol-gel mixture to a cellulose nanocrystal (CNC) is the same as shown in Table 1 below. Afterward, 12.45 ml distilled water was added to prepare a $TiO_2$ precursor solution.

An indium tin oxide substrate having a width and length of 2.5 cm×2.5 cm was prepared, and the previously prepared $TiO_2$ precursor solution (80±1 μl) was applied onto the substrate through spin coating using a spin coater. In this case, the spin coating was carried out at a speed of 2,000 rpm. The coated indium tin oxide substrate was immobilized in an electric furnace, and calcination was carried out while maintaining a constant temperature within a temperature range shown in Table 1 below for 1 hour (temperature elevation rate: 2° C./min) to prepare a composite material (average thickness: 150±10 nm) in which the titanium dioxide thin film was formed on the substrate.

TABLE 1

|  | Content of CNC dispersion solution | Weight ratio of $Ti^{4+}$/CNC | Calcination temperature |
|---|---|---|---|
| Example 1 | 6.497 g | 0.5 | 350 ± 5° C. |
| Example 2 | 5.053 g | 1.0 |  |
| Example 3 | 3.609 g | 1.5 |  |
| Example 4 | 2.166 g | 2.0 |  |
| Example 5 | 0.722 g | 2.5 |  |
| Example 6 | 6.497 g | 0.5 | 400 ± 5° C. |
| Example 7 | 5.053 g | 1.0 |  |
| Example 8 | 3.609 g | 1.5 |  |
| Example 9 | 2.166 g | 2.0 |  |
| Example 10 | 0.722 g | 2.5 |  |
| Example 11 | 6.497 g | 0.5 | 450 ± 5° C. |
| Example 12 | 5.053 g | 1.0 |  |
| Example 13 | 3.609 g | 1.5 |  |
| Example 14 | 2.166 g | 2.0 |  |
| Example 15 | 0.722 g | 2.5 |  |

Examples 16 to 30

Preparation of Composite Material

Titanium ethoxide (TEOT) was prepared as a titanium dioxide ($TiO_2$) precursor, and the CNC dispersion solution prepared in Preparation Example 1 was diluted to a concentration of 8.7 wt %. Afterward, TEOT (0.978 g, 4.695 mmol) and a 37±0.5 wt % hydrochloric acid solution (0.765 g, 9.23 mmol) were mixed for 10 minutes to induce a sol-gel reaction, and cellulose crystals were then added in such a way that a weight ratio ($Ti^{4+}$/CNC) of a tetravalent titanium ion ($Ti^{4+}$) present in the sol-gel mixture to a cellulose nanocrystal (CNC) is the same as shown in Table 2 below. Afterward, 12.45 ml distilled water was added to prepare a $TiO_2$ precursor solution.

An indium tin oxide substrate having a width and length of 2.5 cm×2.5 cm was prepared, and the previously prepared $TiO_2$ precursor solution (80±1 μl) was applied onto the substrate through spin coating using a spin coater. In this case, the spin coating was carried out at a speed of 2,000 rpm. The coated indium tin oxide substrate was immobilized in an electric furnace, and calcination was carried out while maintaining a constant temperature within a temperature range shown in Table 2 below for 1 hour (temperature elevation rate: 2° C./min) to prepare a composite material in which the titanium dioxide thin film was formed on the substrate.

TABLE 2

|  | Content of CNC dispersion solution | Weight ratio of $Ti^{4+}$/CNC | Calcination temperature |
|---|---|---|---|
| Example 16 | 6.497 g | 0.5 | 350 ± 5° C. |
| Example 17 | 5.053 g | 1.0 |  |
| Example 18 | 3.609 g | 1.5 |  |
| Example 19 | 2.166 g | 2.0 |  |
| Example 20 | 0.722 g | 2.5 |  |
| Example 21 | 6.497 g | 0.5 | 400 ± 5° C. |
| Example 22 | 5.053 g | 1.0 |  |
| Example 23 | 3.609 g | 1.5 |  |
| Example 24 | 2.166 g | 2.0 |  |
| Example 25 | 0.722 g | 2.5 |  |
| Example 26 | 6.497 g | 0.5 | 450 ± 5° C. |
| Example 27 | 5.053 g | 1.0 |  |
| Example 28 | 3.609 g | 1.5 |  |
| Example 29 | 2.166 g | 2.0 |  |
| Example 30 | 0.722 g | 2.5 |  |

Examples 31 and 32

Preparation of Composite Material

Titanium tetraisopropoxide (TTIP) was prepared as a titanium dioxide ($TiO_2$) precursor, and the CNC dispersion solution prepared in Preparation Example 1 was diluted to a concentration of 8.7 wt %. Afterward, TTIP (1.334 g, 4.695 mmol) and a 37±0.5 wt % hydrochloric acid solution (0.765 g, 9.23 mmol) were mixed for 10 minutes to induce a sol-gel reaction, and cellulose crystals were then added in such a way that a weight ratio ($Ti^{4+}$/CNC) of a tetravalent titanium ion ($Ti^{4+}$) present in the sol-gel mixture to a cellulose nanocrystal (CNC) became 0.5. Afterward, 12.45 ml distilled water was added together with molybdenum chloride ($MoCl_5$) or niobium chloride ($NbCl_5$) at 0.05 mol % with respect to the content of a tetravalent titanium ion present in TTIP to prepare a $TiO_2$ precursor solution.

An indium tin oxide substrate having a width and length of 2.5 cm×2.5 cm was prepared, and the previously prepared $TiO_2$ precursor solution (80±1 μl) was applied onto the substrate through spin coating using a spin coater. In this case, the spin coating was carried out at a speed of 2,000 rpm. The coated indium tin oxide substrate was immobilized in an electric furnace, and calcination was carried out while maintaining a constant temperature at 400±5° C. for 1 hour (temperature elevation rate: 2° C./min) to prepare a composite material in which the titanium dioxide thin film doped with molybdenum (Mo) or niobium (Nb) was formed on the substrate.

Comparative Examples 1 to 6

Titanium ethoxide (TEOT) and titanium tetraisopropoxide (TTIP) were prepared as titanium dioxide ($TiO_2$) precursors. To prevent precipitation of a sol caused by a rapid hydration reaction, the $TiO_2$ precursor, ethanol, distilled water, and a 37±0.5 wt % hydrochloric acid solution were mixed in a molar ratio shown in Table 3 below, and distilled water was then added in a dropwise manner to prepare a $TiO_2$ precursor solution.

An indium tin oxide substrate having a width and length of 2.5 cm×2.5 cm was prepared, and the previously prepared $TiO_2$ precursor solution (80±1 μl) was applied onto the substrate through spin coating using a spin coater. In this case, the spin coating was carried out at a speed of 2,000 rpm. The coated indium tin oxide substrate was immobilized in an electric furnace, and calcination was carried out while maintaining a constant temperature within a temperature range shown in Table 3 below for 1 hour (temperature elevation rate: 2° C./min) to prepare a composite material in which the titanium dioxide thin film was formed on the substrate.

TABLE 3

|  | Content [molar ratio] | | | | | |
|---|---|---|---|---|---|---|
|  | Type of $TiO_2$ precursor | $TiO_2$ precursor | Ethanol | Distilled water | 37 wt % hydrochloric acid | Calcination temperature |
| Comparative Example 1 | TTIP | 1 | 15 | 90 | 0.2 | 350 ± 5° C. |
| Comparative Example 2 |  |  |  |  |  | 400 ± 5° C. |

TABLE 3-continued

| | Type of TiO$_2$ precursor | TiO$_2$ precursor | Ethanol | Distilled water | 37 wt % hydrochloric acid | Calcination temperature |
|---|---|---|---|---|---|---|
| Comparative Example 3 | | | | | | 450 ± 5° C. |
| Comparative Example 4 | TEOT | 1 | 20 | 1 | 0.2 | 350 ± 5° C. |
| Comparative Example 5 | | | | | | 400 ± 5° C. |
| Comparative Example 6 | | | | | | 450 ± 5° C. |

Experimental Example 1

In order to confirm the surface structure of the composite material according to the present invention, the composite materials prepared in Examples 21 to 30 and Comparative Examples 5 (FIG. 2F) and 6 (FIG. 3F) were subjected to scanning electron microscope (SEM) analysis. In this case, the analysis was carried out using FE-SEM analysis equipment (JEOL Ltd.) under conditions of an accelerating voltage of 15 kV, a working distance (WD) of 5.0 mm, and 100 k magnification, and results thereof are shown in FIGS. 2A-2F and 3A-3F.

Referring to FIG. 2, the composite materials according to Examples 21 to 25 (FIGS. 2A-2E) of the present invention include pores in the surface thereof, and the pores have a fiber shape, an average size in a longitudinal direction (L) of about 180 to 230 nm, and an average size in a thickness direction (D) of about 4 to 8 nm (L/D=6.4 to 52.08). In addition, in the case of the composite materials, a formation rate of a fiber-shaped pore decreases with an increasing weight ratio (Ti$^{4+}$/CNC) of a tetravalent titanium ion and a cellulose nanocrystal included in the precursor solution. Referring to FIG. 3, like the composite materials prepared in Examples 21 to 25 (FIGS. 2A-2E), the composite materials prepared in Examples 26 to 30 (FIGS. 3A-3E) include pores in the surface thereof, and a formation rate of fiber-shaped pore decreases with an increasing weight ratio (Ti$^{4+}$/CNC) of a tetravalent titanium ion and a cellulose nanocrystal included in the precursor solution. However, since the composite materials according to Examples 26 to 30 (FIGS. 3A-3E) have been calcined at 450±5° C., individual titania particles formed by reduction of the TiO$_2$ precursor are more actively agglomerated, and thus the pores thus formed do not retain a fiber shape.

This indicates that cellulose nanocrystals that are included along with a TiO$_2$ precursor in a precursor solution are carbonized during a calcination process of the composite material to form pores, and the morphology of the pore thus formed is affected by a calcination temperature.

Experimental Example 2

In order to confirm the crystal form of the titanium dioxide thin film of the composite material according to the present invention, the composite materials prepared in Examples 6, 8, 11, and 13 and Comparative Examples 2 and 3 were subjected to X-ray diffraction (XRD) analysis. In this case, the XRD analysis was carried out using an XRD analyzer commercially available from Rigaku Corporation, and XRD patterns were obtained by scanning at a wavelength of 1.5406 Å (Cu K-α radiation, 40 kV, 100 mA) in a 2θ range of 10°-80° at a scan speed of 5°/sec. Results thereof are shown in FIGS. 4 and 5.

Referring to FIG. 4, all the cellulose nanocrystals included in the titanium dioxide (TiO$_2$) precursor solution are carbonized during calcination and thus are not present in the thin film of the composite material according to the present invention. In addition, titanium dioxide (TiO$_2$) included in the thin film has three crystalline phases: anatase, rutile, and brookite, and, among these crystalline phases, a content atio of an anatase crystalline phase increases with an increasing weight ratio (Ti$^{4+}$/CNC) of the tetravalent titanium ion and the cellulose nanocrystal included in the titanium dioxide (TiO$_2$) precursor solution. Specifically, in the case of the composite material according to Example 6 in which a weight ratio (Ti$^{4+}$/CNC) of the tetravalent titanium ion and the cellulose nanocrystal is 0.5, an anatase crystalline phase accounts for about 80±1% or more of the entire TiO$_2$ crystals in the titanium dioxide thin film, and in the case of the composite material according to Example 8 in which a weight ratio (Ti$^{4+}$/CNC) thereof is 1.5, most of the rutile and brookite crystalline phases disappear, and thus an anatase crystalline phase accounts for about 99±1% of the entire TiO$_2$ crystals in the titanium dioxide thin film. On the other hand, in the case of the composite material according to Comparative Example 2 in which cellulose nanocrystals are not included in the titanium dioxide (TiO$_2$) precursor solution, titanium dioxide (TiO$_2$) with an anatase phase is included at about 60±1% or less of the entire TiO$_2$ crystals in the thin film.

This indicates that cellulose nanocrystals included in the precursor solution induce the reduction of the titanium dioxide (TiO$_2$) precursor to titanium dioxide (TiO$_2$) with an anatase crystalline phase during calcination.

Referring to FIG. 5, the thin film of the composite materials according to Examples 11 and 13 includes titanium dioxide (TiO$_2$) with an anatase crystalline phase at about 95±1% or more. However, in the case of the composite material prepared in Example 13, although a weight ratio (Ti$^{4+}$/CNC) of the tetravalent titanium ion and the cellulose nanocrystal included in the titanium dioxide (TiO$_2$) precursor solution is 1.5, a small amount of titanium dioxide (TiO$_2$) with rutile and brookite crystalline phases is present.

This indicates that a calcination temperature of the composite material affects the crystalline phase of titanium dioxide (TiO$_2$) included in the thin film.

From these results, it can be seen that, in order to induce the crystalline phase of titanium dioxide (TiO$_2$) included in the thin film to have an anatase crystalline phase exhibiting excellent photoactivity, cellulose nanocrystals need to be used in the precursor solution, and calcination of a composite material needs to be performed at a low temperature of 450° C. or less.

Experimental Example 3

In order to confirm the specific surface area of the composite material according to the present invention, the titanium dioxide thin film formed on the substrate in each of the composite materials prepared in Examples 1 to 4, 6 to 9, 11 to 14, 16 to 19, 21 to 24, and 26 to 29 and Comparative Examples 1 to 6 was subjected to Brunauer, Emmett and Teller (BET) analysis. Specifically, a surface of the thin film formed on the substrate was abraded to form a powder-type thin film, 0.08 to 0.15 g powder thus obtained was pretreated at 300° C. for 4 hours, and then an average size and an average specific surface area of pores formed in powder were measured using an BET analyzer (BELSORP). Results thereof are shown in Table 4 below and FIGS. 6A-6B and 7A-7B.

TABLE 4

| | Type of TiO$_2$ precursor | Weight ratio of Ti$^{4+}$/CNC | Calcination temperature | Average size of pore | Average specific surface area |
|---|---|---|---|---|---|
| Example 1 | TTIP | 0.5 | 350 ± 5° C. | 5.1 ± 0.2 nm | 237 ± 3 m$^2$/g |
| Example 6 | | | 400 ± 5° C. | 7.2 ± 0.2 nm | 153 ± 3 m$^2$/g |
| Example 11 | | | 450 ± 5° C. | 7.7 ± 0.2 nm | 123 ± 3 m$^2$/g |
| Example 16 | TEOT | 0.5 | 350 ± 5° C. | 4.9 ± 0.2 nm | 222 ± 3 m$^2$/g |
| Example 21 | | | 400 ± 5° C. | 6.7 ± 0.2 nm | 150 ± 3 m$^2$/g |
| Example 26 | | | 450 ± 5° C. | 7.2 ± 0.2 nm | 117 ± 3 m$^2$/g |
| Example 2 | TTIP | 1.0 | 350 ± 5° C. | 6.2 ± 0.2 nm | 187 ± 3 m$^2$/g |
| Example 7 | | | 400 ± 5° C. | 6.9 ± 0.2 nm | 152 ± 3 m$^2$/g |
| Example 12 | | | 450 ± 5° C. | 11.6 ± 0.2 nm | 85 ± 3 m$^2$/g |
| Example 17 | TEOT | 1.0 | 350 ± 5° C. | 5.7 ± 0.2 nm | 179 ± 3 m$^2$/g |
| Example 22 | | | 400 ± 5° C. | 6.2 ± 0.2 nm | 147 ± 3 m$^2$/g |
| Example 27 | | | 450 ± 5° C. | 10.5 ± 0.2 nm | 80 ± 3 m$^2$/g |
| Example 3 | TTIP | 1.5 | 350 ± 5° C. | 6.1 ± 0.2 nm | 150 ± 3 m$^2$/g |
| Example 8 | | | 400 ± 5° C. | 6.3 ± 0.2 nm | 144 ± 3 m$^2$/g |
| Example 13 | | | 450 ± 5° C. | 9.7 ± 0.2 nm | 76 ± 3 m$^2$/g |
| Example 18 | TEOT | 1.5 | 350 ± 5° C. | 5.4 ± 0.2 nm | 166 ± 3 m$^2$/g |
| Example 23 | | | 400 ± 5° C. | 5.5 ± 0.2 nm | 141 ± 3 m$^2$/g |
| Example 28 | | | 450 ± 5° C. | 9.7 ± 0.2 nm | 72 ± 3 m$^2$/g |
| Example 4 | TTIP | 2.0 | 350 ± 5° C. | 5.8 ± 0.2 nm | 125 ± 3 m$^2$/g |
| Example 9 | | | 400 ± 5° C. | 6.8 ± 0.2 nm | 108 ± 3 m$^2$/g |
| Example 14 | | | 450 ± 5° C. | 9.2 ± 0.2 nm | 65 ± 3 m$^2$/g |
| Example 19 | TEOT | 2.0 | 350 ± 5° C. | 6.5 ± 0.2 nm | 128 ± 3 m$^2$/g |
| Example 24 | | | 400 ± 5° C. | 7.7 ± 0.2 nm | 110 ± 3 m$^2$/g |
| Example 29 | | | 450 ± 5° C. | 9.5 ± 0.2 nm | 59 ± 3 m$^2$/g |
| Comparative Example 1 | TTIP | 0 | 350 ± 5° C. | 5.6 ± 0.2 nm | 91 ± 3 m$^2$/g |
| Comparative Example 2 | | | 400 ± 5° C. | 6.6 ± 0.2 nm | 57 ± 3 m$^2$/g |
| Comparative Example 3 | | | 450 ± 5° C. | 11.1 ± 0.2 nm | 40 ± 3 m$^2$/g |
| Comparative Example 4 | TEOT | 0 | 350 ± 5° C. | 5.1 ± 0.2 nm | 97 ± 3 m$^2$/g |
| Comparative Example 5 | | | 400 ± 5° C. | 6.4 ± 0.2 nm | 58 ± 3 m$^2$/g |
| Comparative Example 6 | | | 450 ± 5° C. | 9.6 ± 0.2 nm | 37 ± 3 m$^2$/g |

Referring to FIGS. 6A-6B and 7A-7B, the composite materials according to Examples of the present invention include a titanium dioxide thin film with a porous structure including pores having an average size of 4 nm to 8 nm and an average specific surface area of 100 m$^2$/g or more. Also, as a calcination temperature is lower, an average specific surface area increases. On the other hand, although the titanium dioxide thin films according to Comparative Examples, which are prepared using the titanium dioxide (TiO$_2$) precursor solution not including cellulose nanocrystals, have a porous structure, they exhibit a significantly small average specific surface area even when calcined in the same temperature range as in Examples.

This indicates that cellulose nanocrystals that are included along with a titanium dioxide (TiO$_2$) precursor in a precursor solution are carbonized during a calcination process of the composite material to form pores, and the pores thus formed have an increased average specific surface area of titanium dioxide (TiO$_2$).

Therefore, the composite material according to the present invention can be beneficially used in various fields utilizing titanium dioxide as a photocatalyst because a titanium dioxide thin film included in the composite material is formed through a simple process by using cellulose crystals, the structure of the thin film is easily controlled, and the thin film also has a large specific surface area, excellent scratch resistance, and excellent photoactivity.

Experimental Example 4

In order to evaluate the scratch resistance of the composite material according to the present invention, the titanium dioxide thin film formed on the surface in each of the composite materials prepared in Examples 1, 6, and 11 was subjected to a scratch hardness test. Specifically, the titanium dioxide thin film was indented while applying a load of 1 to 200 N using a 30 nm steel ball provided in a Rockwell hardness measuring instrument, and a load applied when a scratch occurs on the surface of the thin film was measured.

As a result, it was confirmed that the composite material according to the present invention has a scratch hardness of about 10 N to 35 N. From these results, it can be seen that the composite material according to the present invention exhibits excellent scratch resistance.

INDUSTRIAL APPLICABILITY

A composite material according to the present invention can be beneficially used in various fields utilizing titanium dioxide as a photocatalyst because a titanium dioxide thin film included in the composite material is formed through a simple process by using cellulose crystals, the structure of the thin film is easily controlled, and the thin film also has a large specific surface area, excellent scratch resistance, and excellent photoactivity.

The invention claimed is:

1. A method of preparing a composite material, comprising:

applying a mixture including a titanium dioxide precursor, cellulose crystals, and one or more transition metals compound onto a substrate; and thermally treating the applied mixture to form a titanium dioxide thin film, wherein the thin film includes titanium dioxide doped with the one or more transition metals selected from the group consisting of molybdenum (Mo), niobium (Nb), tungsten (W), iron (Fe), and silver (Ag), wherein the cellulose crystals have an average length of 150 nm to 500 nm, wherein the titanium dioxide thin film has a harness of 10 N to 50 N, wherein the thin film includes a pore satisfying conditions of Expressions 1 and 2 below:

$$150 \leq L \leq 300 \quad \text{[Expression 1]}$$

$$15 \leq L/D \leq 70 \quad \text{[Expression 2]}$$

In Expressions 1 and 2,

L represents an average size in a longitudinal direction of a pore,

D represents an average size in a thickness direction of a pore, and

L and D are indicated in units of nm.

2. The method of claim 1, wherein the titanium dioxide precursor includes a tetravalent titanium ion ($Ti^{4+}$).

3. The method of claim 1, wherein the titanium dioxide precursor is one or more selected from the group consisting of titanium tetraisopropoxide, titanium ethoxide, titanium butoxide, and titanium tetrachloride.

4. The method of claim 1, wherein the cellulose crystals are cellulose nanocrystals (CNC), and the titanium dioxide precursor is included in the mixture in such a way that a weight ratio ($Ti^{4+}$/CNC) of the tetravalent titanium ion ($Ti^{4+}$) included in the titanium dioxide precursor to the cellulose nanocrystal (CNC) is 0.1 to 10.

5. The method of claim 1, wherein the cellulose crystal has an average diameter of 0.1 nm to 10 nm.

6. The method of claim 1, wherein the mixture further includes a 35±3 wt % hydrochloric acid aqueous solution at 50 to 90 parts by weight with respect to 100 parts by weight of the titanium dioxide precursor.

7. The method of claim 1, wherein the thermal treatment is carried out at a temperature ranging from 300° C. to 600° C. for 10 minutes to 100 minutes.

* * * * *